United States Patent
Agapi et al.

(10) Patent No.: US 7,548,977 B2
(45) Date of Patent: Jun. 16, 2009

(54) CLIENT / SERVER APPLICATION TASK ALLOCATION BASED UPON CLIENT RESOURCES

(75) Inventors: Ciprian Agapi, Lake Worth, FL (US); Charles W. Cross, Jr., Wellington, FL (US); Nicolae D. Metianu, Lake Worth, FL (US); Paritosh D. Patel, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 11/056,493

(22) Filed: Feb. 11, 2005

(65) Prior Publication Data

US 2006/0184626 A1 Aug. 17, 2006

(51) Int. Cl.
*G06F 15/173* (2006.01)
(52) U.S. Cl. .................. 709/226; 709/203; 709/206; 709/223; 709/224; 709/225; 709/229; 709/232; 704/260; 370/235
(58) Field of Classification Search .......... 709/203, 709/206, 223–226, 229, 232; 704/260; 370/235
See application file for complete search history.

(56) References Cited

U.S. PATENT DOCUMENTS

| | | | |
|---|---|---|---|
| 5,546,538 A | | 8/1996 | Cobbley et al. |
| 5,974,392 A | * | 10/1999 | Endo ............................ 705/8 |
| 7,016,845 B2 | * | 3/2006 | Vora et al. .................. 704/270.1 |
| 7,111,300 B1 | * | 9/2006 | Salas et al. ................... 718/105 |
| 7,140,020 B2 | * | 11/2006 | McCarthy et al. ............ 718/104 |
| 2002/0087328 A1 | * | 7/2002 | Denenberg et al. .......... 704/275 |
| 2002/0152305 A1 | * | 10/2002 | Jackson et al. .............. 709/224 |
| 2003/0037092 A1 | * | 2/2003 | McCarthy et al. ........... 709/104 |
| 2003/0120778 A1 | * | 6/2003 | Chaboud et al. ............. 709/225 |
| 2003/0236813 A1 | | 12/2003 | Abjanic |
| 2003/0236890 A1 | | 12/2003 | Hurwitz et al. |
| 2004/0021764 A1 | | 2/2004 | Driscoll, Jr. et al. |
| 2004/0093216 A1 | * | 5/2004 | Ashish et al. .............. 704/270.1 |
| 2005/0086059 A1 | * | 4/2005 | Bennett ...................... 704/270 |
| 2005/0091221 A1 | * | 4/2005 | Harris et al. .................. 707/10 |

* cited by examiner

*Primary Examiner*—Liangche A Wang
(74) *Attorney, Agent, or Firm*—Novak Druce + Quigg

(57) ABSTRACT

A software method for allocating application tasks between a client and a server can include the step of detecting client-based computing resources for executing at least one application task. At least one indicator of the detected client-based computing resources can be conveyed to a remotely located application server, the application server can determine whether to allocate at least one application task to the client or to a server component based upon at least one indicator.

3 Claims, 2 Drawing Sheets

CLIENT / SERVER APPLICATION TASK ALLOCATION BASED UPON CLIENT RESOURCES

BACKGROUND

1. Field of the Invention

The present invention relates to the field of distributed applications, client/server topographies, speech processing and, more particularly, to client/server application task allocation based upon accessed client resources.

2. Description of the Related Art

Conventional client/server distributed applications do not take into account the amount of processing power a client has at a given time and do not attempt to match available client resources with client-centric tasks. Instead, client/server applications generally follow a "one size fits all" paradigm, where each client is treated in a similar fashion to every other client. The disregard of the processing power (in terms of available bandwidth, CPU capabilities, memory, and other resources) available through the client can greatly reduce the client responsiveness. Alternatively, failure to access and utilize available client resources can needlessly consume server resources as well as other limited network resources.

The deficiency of a one size fits all paradigm is especially problematic in client/server applications running on handheld devices and other computing devices having limited resources. For example, the wide use of handheld devices, such as smart phones, personal data assistants, pervasive computing devices, embedded devices, and the like, that interact with various voice applications has brought speech recognition and synthesis to the forefront of software development. Speech recognition and speech synthesis capabilities can consume extreme amounts of computing resources, like CPU cycles, RAM, and non-volatile memory. Additionally, devices utilizing distributed speech processing applications have greatly varying capabilities. As a result, some client devices can locally execute speech processing tasks, other client devices can locally execute a portion of desired speech processing task, and still other client devices cannot execute significant speech processing tasks using local resources.

This situation is further complicated because many client devices have multitasking capabilities, so that these client devices can execute speech processing tasks locally when other activities are low, but when other client-centric tasks are being performed, lack the resources to locally execute speech processing tasks.

Accordingly, a mechanism is needed that can analyze the capabilities and resources available within a client and can, based upon this analysis, allocate application tasks between a client and a server. Preferably, this mechanism could be capable of allocating tasks using statically and/or dynamically determined client resource information.

SUMMARY OF THE INVENTION

The subject matter presented herein includes a system, method, and apparatus for allocating application tasks between a server and/or a client based upon available client resources in accordance with an embodiment of the inventive arrangements disclosed herein. One advantage of allocating tasks based on available resources is that a substantial portion of server load can thusly be offloaded to client devices, without the users of the client devices suffering from poor performance.

The task allocations can be based upon application specific code, where software designers can configure resource thresholds for computationally intensive tasks. These thresholds can determine whether these intensive tasks are executed upon a client or upon a server. The task allocation can also be performed automatically, without requiring explicit developer code. Developer selectable settings can turn on or off automatic task allocation for developer selectable tasks, thereby permitting design time application optimizations. Accordingly, the provided solution is a highly flexible one, which can be implemented for all application tasks or for selected application tasks based upon task independent or task specific configuration settings.

For example, the disclosed invention can be used to allocate speech processing tasks between a client and a server. In one embodiment, when the speech processing task is a speech recognition task, an application programmer can specify where a grammar should be loaded and where a speech recognition task is to be performed based upon the size of the grammar. Additionally, the client can communicate available resources periodically to an application server so that the server can adjust workload based upon presently available resources of the client. The application server can also dynamically poll the client for resource information in making its workload determinations. Resources that these determinations are based upon can include, but are not limited to, available client memory, client CPU capabilities, and network throughput available for conveying data to the client. Additionally, in particular arrangements, the application server can also receive indicators of server resource availability and base its workflow determinations by balancing the performance needs of a task with the available resources of the client and/or server.

The present invention can be implemented in accordance with numerous aspects consistent with material presented herein. For example, one aspect of the present invention can include a software method for allocating application tasks between a client and a server. The method can include the step of detecting client-based computing resources for executing at least one application task. At least one indicator of the detected client-based computing resources can be conveyed to a remotely located application server, and the application server can determine whether to allocate at least one application task to the client or to a server component based upon at least one indicator.

Another aspect of the present invention can include an application serving system including a server engine, a client engine, a load analyzer, and a load distributor. The server engine can be located within an application server and can be configured to selectively execute at least one application task for the application server. The client engine can be located within a client remotely located from the application server and can be configured to selectively execute one or more application tasks for the application server. The load analyzer can detect computing resources of the client and convey an indicator of this detected computing resource to the load distributor. The load distributor can selectively allocate application tasks between the server engine and the client engine based upon the indicators received from the load analyzer.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
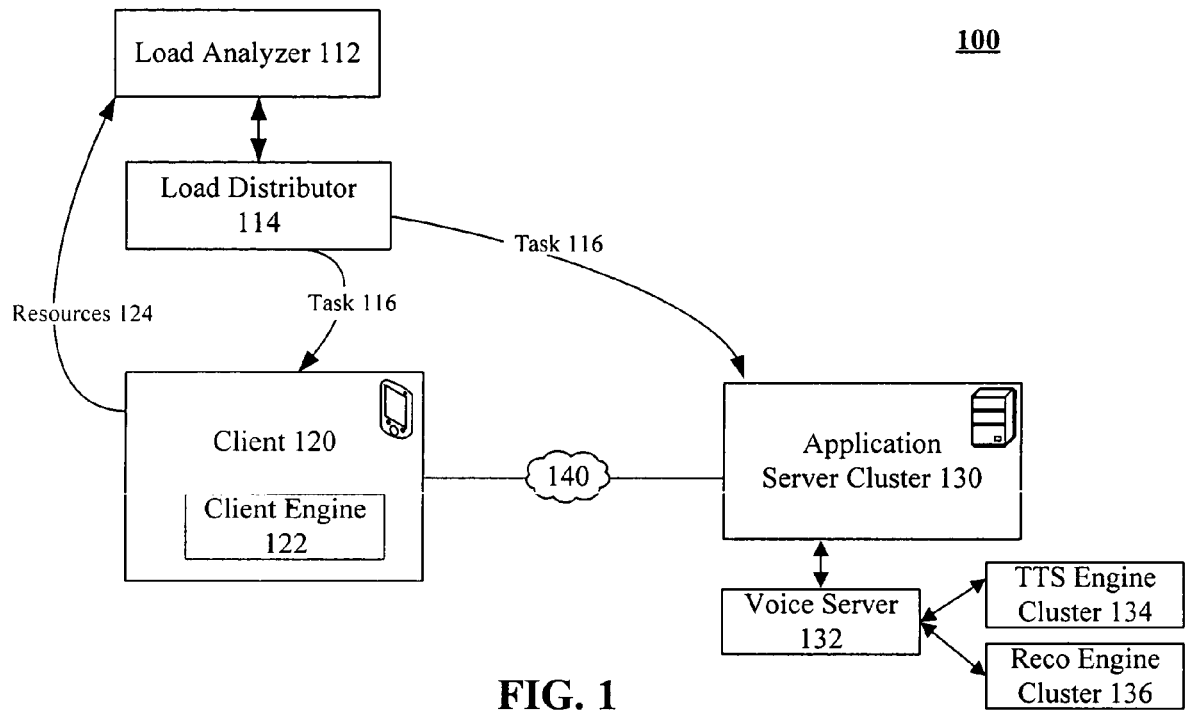
FIG. 1 is a schematic diagram illustrating a distributed application serving system that allocates tasks between a client and an application server based upon client resources in accordance with an embodiment of the inventive arrangements disclosed herein.

FIG. 1 is a schematic diagram illustrating a distributed application serving system 100 that allocates tasks between a client 120 and an application server cluster 130 based upon client resources in accordance with an embodiment of the inventive arrangements disclosed herein. The system 100 can include a client 120 communicatively linked to an application server cluster 130 via a network 140. The client 120 can include a client engine 122, which is a computing space within the client 120 for executing one or more tasks. The application server cluster 130 can utilize a voice server 132 to execute one or more tasks. For example, the voice server 132 can manage a TTS engine cluster 134 and/or a recognition engine cluster 136, which can perform text-to-speech tasks and speech recognition tasks respectively.

In one embodiment, the client 120 can be located within a computing device having limited resources, such as a handheld device, an embedded device, a pervasive computing device, and the like. Computing devices having limited resources often utilize a compact operating system platform that can be a scaled down version of a desktop operating system designed for including or embedding in mobile and other space-constrained devices. For example, the computing device can utilize the Palm OS from PalmSource, Inc. of Sunnydale Calif., an Embedded Linux operating system, and the like. The client 120 can also be located within a traditional computing device, like a desktop computer or notebook computer having less limited resources than a personal data assistant (PDA) or a smartphone, but nevertheless being constrained to a definable set of computing resources.

The load analyzer 112 can be a computing component that analyzes the configuration of the client 120 as well as the computing resources 124 available for the client 120 at any point in time. As used herein, computing resources 124 can include any resources that could reasonably affect the ability of the client 120 to execute a task. More specifically, computing resources can include, but are not limited to, a memory, a CPU capability, and a communication throughput level for exchanging data with the client 120.

In one embodiment, the load analyzer 112 can be a software component of the client 120. In other embodiments, the load analyzer 112 can be a component of the application server cluster 130, a stand-alone application, a routine included within hardware or software of a network element of network 140, and the like.

The load distributor 114 can selectively allocate application tasks 116 between the voice server 132 and the client engine 122 based upon the indicators received from the load analyzer 112, where the indicators convey information pertaining to the resources 124. In one embodiment, the load analyzer 112 can be a software component of the application server cluster 130. In other embodiments, the load analyzer 112 can be a component of the client 120, a stand-alone application, a routine included within hardware or software of a network element of network 140, and the like.

In a particular embodiment, the load distributor 114 can determine a resource level necessary to perform an identified application task. Moreover, the load distributor 114 can take into account a desired performance level, execution time requirements for the application task, and other such factors when determining the necessary resource level. The load distributor 114 can utilize the determined resource level, the desired performance level, the resource indicators, as well as a plurality of inference rules when making task allocation determinations.

In a further embodiment, particular ones of the inference rules can operate based upon an established lower resource limit or an established upper resource limit. Application tasks 116 having resource requirements as determined by the load distributor 114 below the lower resource limit can be always allocated to the client engine 122. Application tasks having resource requirements above the upper resource limit can always be allocated to the voice server 132. Application tasks having resource requirements between the lower and upper limits can be allocated by the load distributor 114 based upon currently available resources of the client 120.

In still another embodiment, the resource allocations of the load distributor 114 can be based upon factors specific to the type of application tasks being allocated and criteria associated therein. For example, when the application task is a speech processing task, the determinations of the load distributor 114 can be made upon speech processing specific factors.

More specifically, one type of speech processing task that can be allocated includes a speech recognition task. The load distributor 114 can selectively allocate the speech recognition task based at least in part upon a size of grammar used in the speech recognition task. For example, the below pseudocode can be used to implement speech recognition task specific allocations:

---

If the grammar is small (e.g. includes the 50 US
states) allocate the speech recognition task to the
client engine 122
    <grammar src = "state.jsgf" reco= "local"/>
If the grammar is large (e.g. includes 100,000
street names) allocate the speech recognition task to
the voice server 132
    <grammar src = "streets.jsgf" reco= "server"/>
If the grammar is medium (e.g. includes 300 cities
in a state) selectively allocate the speech recognition
task based on available client 120 resources
<grammar src = "cities.jsgf" reco=
"resource_availability_dependent"/>

---

It should be appreciated that the "grammar is small" situation represents an implementation of a lower resource requirement limit and that the "grammar is large" situation represents an implementation of an upper resource requirement limit. Further, the lower and upper limits can be specifically configured to account for the hardware and software configuration of the client 120. For example, "small" may be defined to include fifty or more entries for a mobile telephone, but "small" may include thousands of entries for a more robust computing platform, like a personal data assistant.

Another type of speech processing task that can be allocated includes a text-to-speech conversion task. The load distributor 114 can selectively allocate the text-to-speech conversion task based at least in part upon the complexity of the text-to-speech conversion task. Complexity can be based upon any of a variety of factors including, but not limited to, the text length to be converted, a sound quality of resulting speech, and a number of languages needed for the text-to-speech conversion task (mixed language TTS). For example, the below pseudocode can be used to implement text-to-speech conversion task specific allocations.

```
If the TTS complexity is low allocate the TTS
conversion task to the client engine 122
    <prompt tts = "local"/>
If the TTS complexity is high allocate the TTS
conversion task to the voice server 132
    <prompt tts = "server"/>
If the TTS complexity is low allocate the TTS
conversion task based on available client 120
resources
    <prompt tts = "resource_availability_dependent"/>
```

As shown herein, network 140 can represent any communication mechanism capable of conveying digitally encoded information. Networks 140 can include a telephony network like a Public Switched Telephone Network (PSTN) or a mobile telephone network, a computer network like a local area network or a wide area network, a cable network, a satellite network, a broadcast network, and the like. Further, networks 140 can use wireless as well as line-based communication pathways. Digitally encoded information can be conveyed via network 140 in accordance with any communication protocol, such as a packet-based communication protocol or a circuit based communication protocol.

It should be appreciated that the invention disclosed herein is not limited to speech-processing applications and that it can be applied to other applications so that the other applications can take advantage of dynamic off-loading techniques detailed herein. When used in conjunction with other applications, the voice server 132 can be replaced with one or more server engines 132 that perform one or more tasks for the other applications.

It should be appreciated that the arrangements shown in FIG. 1 are for illustrative purposes only and that the invention is not limited in this regard. The client 120 and application server cluster 130 can each be implemented in a distributed or centralized fashion. For example, while it is typical for applications to be served from a cluster, such as application server cluster 130, non-clustered server architectures, like an architecture consisting of a single, stand-alone application server, are also contemplated herein.

Additionally, the functionality attributable to the various components of system 100 can be combined or separated in different manners than those illustrated herein. For instance, the load analyzer 112 and the load distributor 114 can be implemented as a single integrated component in one embodiment of the present invention. In another embodiment of the present invention, the functionality of the load analyzer 112 can be implemented within a plurality of separate software components.

Figure 2:
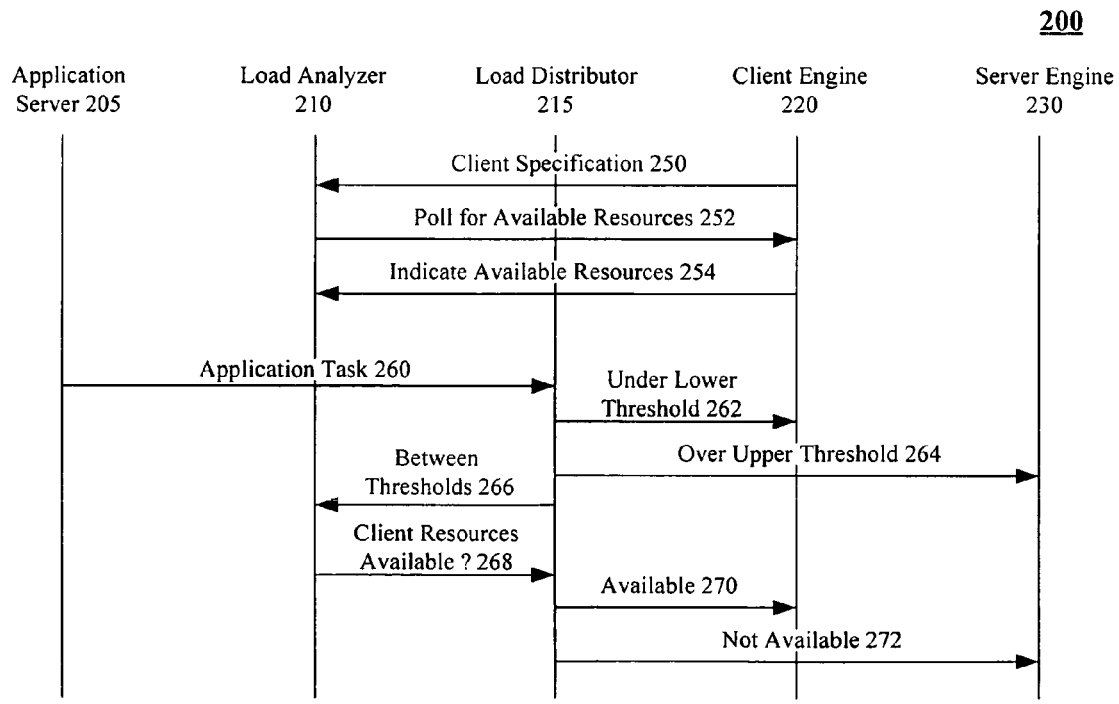
FIG. 2 is a process flow of a system that allocates application tasks in a client/server environment based upon client resources in accordance with an embodiment of the inventive arrangements disclosed herein.

FIG. 2 is a process flow of a system 200 that allocates application tasks in a client/server environment based upon client resources in accordance with an embodiment of the inventive arrangements disclosed herein. In one embodiment, system 200 can represent information flows for the system 100. In such an embodiment, the application server 205, the load analyzer 210, the load distributor 215, the client engine 220, and the server engine 230 can correspond to the application server cluster 130, the load analyzer 112, the load distributor 114, the client engine 122, and the voice server 132 respectively. The system 200 is not to be limited in this regard, however, and can be performed in the context of any system capable of allocating tasks based upon client resources.

In system 200, as indicated by flow 250, a client specification detailing a client's hardware and software configuration and capabilities can be conveyed from a client engine 220 to a load analyzer 210. In one embodiment, flow 250 can be performed during a client registration process or when a user of the client remotely connects to an application server 205. Additionally, the client specification information can be used to establish client-specific thresholds.

In flow 252, the load analyzer 210 can poll the client engine 220 for available resources. Notably, clients can reside upon multi-tasking computing environments, where numerous tasks which may not relate to applications provided by the application server 205 can execute upon the client. Available resource can be any resource that affects a client's ability to process application tasks, such as memory, available CPU cycles, and available network throughput between the application server 205 and the client engine 220. In flow 254, the client engine 220 can indicate available resources to the load analyzer 210. Flow 252 and responsive flow 254 can be repeated from time to time to maintain an accurate account of resource availability.

In flow 260, an application task can be conveyed from the application server 205 to the load distributor 215. The load distributor 215 can allocate the task to the client engine 220 if the resource level needed for the task falls under a lower threshold, as shown by flow 262. In flow 264, if the needed resource level for the task is over an upper threshold, the task can be conveyed to the server engine 230.

Flows 262 and 264 are optional and separately implementable flows, which when implemented can be configurable values. One advantage of establishing lower and upper thresholds is to expedite task allocation. For example, when a task is relatively trivial and consumes few resources, the lower threshold permits the task to be automatically allocated to the client engine 220 for local execution. When the task is so resource consuming that the client could never perform it within desired performance limitations, the upper threshold can permit the task to be automatically allocated to the server engine 230. In one embodiment, these configurable thresholds can be automatically adjusted on a client-specific basis in accordance with the client specification 250.

In flow 266 when the resource level for the application task is between the lower and upper thresholds, the load distributor 215 can query the load analyzer 210 for available client resources. This step is also performed in embodiments where optionally flows 262 and/or 264 are not enacted. In flow 268, the load analyzer 210 can return to the load distributor 215 data used to determine whether sufficient client resources are available for the application tasks. In flow 270, when resources are available, the load distributor 215 can allocate the task to the client engine 220. In flow 272, when resources are not available, the load distributor 215 can allocate the task to the server engine 230.

Figure 3:
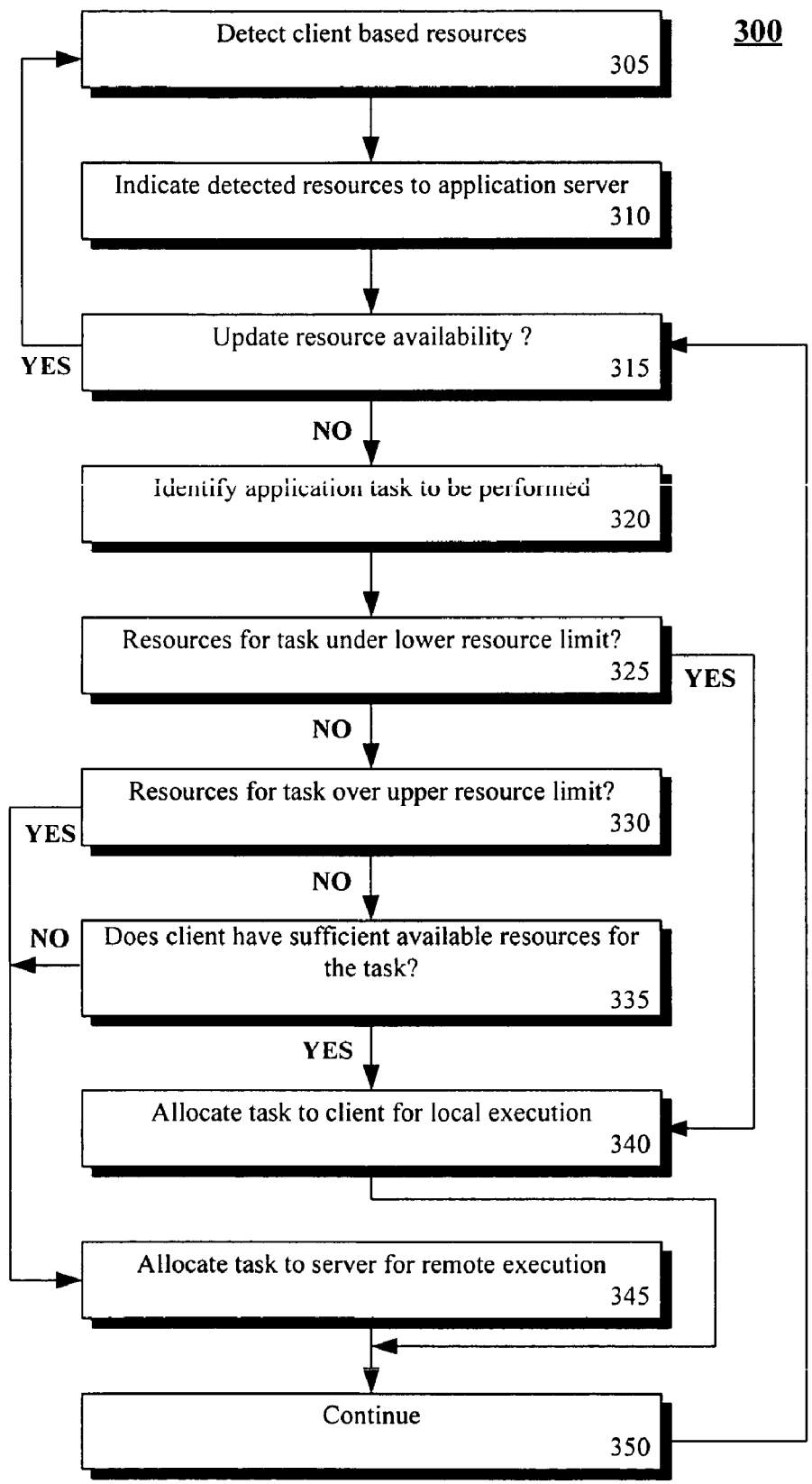
FIG. 3 is a flow chart of a method for allocating application tasks between a client and a server in accordance with an embodiment of the inventive arrangements disclosed herein.

FIG. 3 is a flow chart of a method 300 for allocating application tasks between a client and a server in accordance with an embodiment of the inventive arrangements disclosed herein. Method 300 can be performed in the context of system 100 and/or system 200. Method 300 is not to be limited in this regard, however, and can be performed in the context of any system where resources of a distributed application are allocated between a client and a server based upon resources of the client. The resources of the client can be determined statically, by hardware specifications of the client and/or dynamically by intermittently determining the resources available for the client to execute application server tasks.

The method 300 can begin in step 305 where client based resources can be detected. In step 310, the detected resources can be indicated to the application server. In step 315 a decision as to whether to update resource information can occur. When the resources of the client are to be updated, the method can loop from step 315 to step 305. Updating resources can occur through polling the client from an application server, through periodically having the client publish available resources to the application server, through a combination of the two, or through other such techniques. When the resources of the client are not to be updated in step 315, the method can proceed to step 320, where an application task to be performed can be identified. A general level of resources required to perform the application task can also be determined at this step.

For example, when the application task is a speech recognition task, the size of grammar to be used for speech recognizing an utterance can be used to determine a level of resources required. In another example, when the application task is a text-to-speech conversion task, the complexity of the conversion can be used to determine a level of resources required.

In optional step 325, when the level of resources for the task is under a designated lower resource limit, the method can jump to step 340, where the task can be allocated to the client. Otherwise the method can proceed to step 330. In optional step 330, when the level of resources of the task is over a designated upper resource limit, the method can jump to step 345, where the task can be allocated to the server. Otherwise, the method can proceed to step 335.

In step 335, a determination can be made as to whether the client has sufficient resources available to execute the task at an acceptable performance level. When the client has sufficient resources, the method can proceed to step 340, where the task can be allocated to the client. When in step 335, the client does not have sufficient resources available, the method can progress from step 335 to step 345, where the task can be allocated to the server.

The method can advance from step 340 or 345 to step 350, where the method can continue by looping back to step 315, where resource availability can be updated and additional application task can be identified and allocated according to client resource availability.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for allocating application tasks between a client and a server comprising the steps of:
    detecting client-based computing resources capable of executing at least one application task;
    conveying at least one indicator of the detected client-based computing resources to a remotely-located application server; and
    the application server determining whether to allocate at least one application task to a client or to a server component by comparing the client-based computing resources indicated by the at least one indicator against at least one previously determined resource threshold associated with the application task, and, when the client-based computing resources favorably compare to the previously determined resource threshold, allocating the at least one application task to the client, otherwise allocating the at least one application task to the server component;
    wherein the at least one application server task comprises a speech recognition task, and wherein the determining step is based at least in part upon a size of grammar used in the speech recognition task;
    wherein the at least one application server task comprises a text-to-speech conversion task, and wherein the determining step is based at least in part upon a complexity of the text-to-speech conversion task.

2. An application serving system comprising:
    a server engine located within an application server configured to selectively execute at least one application task for the application server;
    a client engine located within a client remotely located from said application server configured to selectively execute said at least one application task for the application server;
    a load analyzer configured to detect computing resources of said client and to convey an indicator of these detected computing resource to a load distributor; and
    a load distributor configured to selectively allocate application tasks between the server engine and the client engine based upon the indicators received from the load analyzer
    wherein the computing resources detected by the load analyzer include at least two of a memory capacity of the client, a CPU capability of the client, and a communication throughput level for exchanging data with the client;

wherein the application task comprises at least one speech recognition task, and wherein the load distributor selectively allocates the speech recognition task based at least in part upon a size of grammar used in the speech recognition task;

wherein the application task comprises at least one text-to-speech conversion task and wherein the load distributor selectively allocates the text-to-speech conversion task based at least in part upon a complexity of the text-to-speech conversion task, wherein complexity is based upon at least one factor selected from the group consisting of a text length to be converted, a sound quality of resulting speech, and a number of languages needed for the text-to-speech conversion task.

3. A machine-readable storage having stored thereon, a computer program having a plurality of code sections, said code sections executable by a machine for causing the machine to perform the steps of:

detecting client-based computing resources capable of executing at least one application task;

conveying at least one indicator of the detected client-based computing resources to a remotely located application server; and the application server determining whether to allocate at least one application task to a client or to a server component based by comparing the client-based computing resources indicated by the at least one indicator against at least one previously determined resource threshold associated with the application task, and, if the client-based computing resources compare favorably to the previously determined resource threshold, allocating the at least one application task to the client, otherwise allocating the at least one application task to the server component;

wherein the at least one application server task comprises a speech recognition task, and wherein the determining step is based at least in part upon a size of grammar used in the speech recognition task;

wherein the at least one application server task comprises a text-to-speech conversion task, and wherein the determining step is based at least in part upon a complexity of the text-to-speech conversion task.

* * * * *